(12) United States Patent
Worthington et al.

(10) Patent No.: US 7,792,386 B1
(45) Date of Patent: *Sep. 7, 2010

(54) USING DIFFERENCE KERNELS FOR IMAGE FILTERING

(75) Inventors: John W. Worthington, Minnetonka, MN (US); Christopher B. Cox, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 12/102,556

(22) Filed: Apr. 14, 2008

Related U.S. Application Data (63) Continuation of application No. 10/789,674, filed on Feb. 27, 2004, now Pat. No. 7,359,576.

(51) Int. Cl.
- *G06K 9/64* (2006.01)
- *G06K 9/56* (2006.01)
- *G06K 9/76* (2006.01)
- *G06K 9/40* (2006.01)

(52) U.S. Cl. ............... 382/279; 382/205; 382/210; 382/260

(58) Field of Classification Search ........... 382/260, 382/279, 220
See application file for complete search history.

(56) References Cited

U.S. PATENT DOCUMENTS

| | | | |
|---|---|---|---|
| 4,683,496 A | 7/1987 | Tom | |
| 5,541,658 A | 7/1996 | Ishiwata | |
| 5,615,243 A | 3/1997 | Chang et al. | |
| 5,911,005 A | 6/1999 | Uchiyama | |
| 6,215,496 B1 | 4/2001 | Szeliski et al. | |
| 6,457,032 B1 | 9/2002 | Silver | |
| 6,556,696 B1 | 4/2003 | Summers et al. | |
| 6,704,049 B1 | 3/2004 | Fossum | |
| 6,728,416 B1 * | 4/2004 | Gallagher | 382/265 |
| 6,765,589 B1 | 7/2004 | Georgiev et al. | |
| 6,791,540 B1 | 9/2004 | Baumberg | |

(Continued)

OTHER PUBLICATIONS

Frishchluft, Home and Lens care, http://www.frischluft.com/; Jan. 2004, Downloaded from the internet: http://web.archive.org/web/20040110021822/http://www.frischluft.com on Jan. 30, 2006, 6 pages.

(Continued)

*Primary Examiner*—Vu Le
*Assistant Examiner*—Amara Abdi
(74) *Attorney, Agent, or Firm*—Fish & Richardson P.C.

(57) ABSTRACT

Methods and apparatus, including computer program products, for filtering an image. A filter kernel is received to determine one or more filtered values for each pixel in a sequence of pixels, where adjacent pixels are separated by a characteristic distance in the image. A difference kernel is defined based on local differences between a first kernel and a second kernel that are defined by the filter kernel centered at a first location and a second location, respectively. The second location is separated from the first location by the characteristic distance separating adjacent pixels in the sequence. The difference kernel is used to determine a difference between filtered values of adjacent pixels in the sequence. For depth of field filtering, the filter kernel can include a blur filter kernel that is based upon depth values of pixels in the sequence.

19 Claims, 5 Drawing Sheets

U.S. PATENT DOCUMENTS

| | | |
|---|---|---|
| 7,098,932 B2 | 8/2006 | Georgiev et al. |
| 7,171,436 B2 | 1/2007 | Egelmeers et al. |
| 2003/0095693 A1 | 5/2003 | Kaufman et al. |
| 2003/0169944 A1 | 9/2003 | Dowski et al. |
| 2003/0197877 A1 | 10/2003 | Lee |
| 2005/0025378 A1 | 2/2005 | Maurer |

OTHER PUBLICATIONS

IrisFilter: http://www.reiji.net/iris-e/index.html, Title and Introduction, 2004, Downloaded from the internet: http://web.archive.org/web/20040206145438/http://www.reiji.net/iris-e/index.html on Jan. 30, 2006, 5 pages.

* cited by examiner

USING DIFFERENCE KERNELS FOR IMAGE FILTERING

This application is a continuation (and claims the benefit of priority under 35 USC 120) of U.S. application Ser. No. 10/789,674, filed Feb. 27, 2004 now U.S. Pat. No. 7,359,576. The disclosure of the prior application is considered part of (and is incorporated by reference in) the disclosure of this application.

BACKGROUND

The present invention relates to electronic image processing.

An electronic image, such as a digital image, can be represented by an array of closely packed pixels that are basic picture elements. Each pixel represents a local portion of the image, and alone or together with other pixels determines local attributes such as color, gray level, luminosity, transparency or other graphical attributes of the local image portion.

Electronic images are generated or processed by graphical software applications, such as presentation, animation, painting and design applications, or by electronic devices, such as scanners and digital cameras. During image processing, different electronic filters can be used to adjust the image. In general, a filter applies a transformation to pixels of an input image to generate an output image. Electronic filters can achieve various visual effects. Some electronic filters mimic conventional photographic filters such as lenses and apertures that blur, sharpen or otherwise transform images. Other filters transform images in unusual ways. For example, a pointillism filter transforms a digitized photograph into a pointillistic painting in which small strokes of color are applied, so that from a distance the strokes blend together to represent objects in the painting.

One traditional filtering effect is depth of field filtering that changes the depth in which objects seem to be in focus. When imaged by a conventional or digital camera, objects are in focus at a focal distance from the camera. The optics of the camera maps objects at the focal distance to a focal plane defined by the film of the conventional camera or the sensor array of the digital camera. Objects that are closer or farther away than the focal distance are mapped in front of or behind the focal plane and may appear blurred in the photograph. A large depth of field allows objects to seem to be in focus even at distances from the film or sensor that are much larger or smaller than the focal distance. A small depth of field means that only objects at or near the focal distance seem to be in focus and other objects seem blurred.

For electronic depth of field filtering of an image, the local attributes of each pixel include a depth value corresponding to a difference between the focal distance and the distance of the object represented by the pixel from the focal plane. To narrow a large depth of field electronically, a blur filter is selectively applied to different pixels of the digital image based upon the depth values of the pixels. No blur is applied to pixels that have zero depth values corresponding to objects at the focal distance, and a blur is applied at pixels that have non-zero depth values corresponding to objects that are closer or farther than the focal distance. The larger the difference between the focal distance and an object's distance from the focal plane, the more blur is applied to the pixels representing that object. Before applying a depth of field filter, the depth values of the pixels can be arbitrarily defined or altered by a user or a computer application.

A filter typically uses a kernel to generate a filtered value for a pixel whose location is referred to as the center of the kernel. The kernel defines weights that are assigned to pixels in a neighborhood surrounding the kernel's center in the image. The set of pixels that have substantially non-zero weights is referred to as the kernel's support. For example, an optical blur filter typically uses a flat kernel that assigns substantially uniform non-zero weights to all pixels within its support, such as a circular or rectangular support surrounding the kernel's center. When the filter is applied to a pixel, a filtered value is generated such that each neighborhood pixel within the kernel's support contributes to the filtered value in proportion to the weight assigned to the neighborhood pixel.

SUMMARY

To apply a filter to a sequence of pixels having substantially uniform spacing in an image, a difference kernel is defined based on local differences between two kernels of the filter, where the centers of the two kernels are positioned relative to each other as two adjacent pixels in the sequence. In general, in one aspect, the invention provides methods and apparatus, including computer program products, for filtering an image that includes multiple pixels. A filter kernel is received to determine one or more filtered values for each pixel in a sequence of pixels in the image. Adjacent pixels in the sequence are separated by a characteristic distance in the image. The filter kernel specifies filtering weights for pixels in a neighborhood surrounding a center of the filter kernel. A difference kernel is defined based on local differences between a first kernel and a second kernel. The first and second kernels are defined by the filter kernel centered at a first location and a second location, respectively. The second location is separated from the first location by the characteristic distance separating adjacent pixels in the sequence. The difference kernel specifies difference weights for pixels in a neighborhood surrounding a center of the difference kernel. The difference kernel is used to determine a difference between a filtered value of a current pixel and a filtered value of a previous pixel that is adjacent to the current pixel in the sequence.

Particular implementations can include one or more of the following features. The filtered value of the current pixel can be determined based on the filtered value of the previous pixel and the difference between the filtered values of the current pixel and the previous pixel. The filter kernel can specify substantially uniform filtering weights for pixels in a region within the neighborhood surrounding the center of the filter kernel. The filter kernel can specify substantially non-zero filtering weights for pixels in one or more regions that have convex or concave shapes within the neighborhood surrounding the center of the filter kernel. Substantially non-zero filtering weights can be specified for pixels in a circular or elliptical region within the neighborhood surrounding the center of the filter kernel. Each pixel in the sequence can specify substantially the same value for a local attribute of the image, and the received filter kernel can be based upon the same value of the local attribute. The local attribute can be a depth value corresponding to a distance of objects represented by pixels in the sequence relative to a focal distance. Or the local attribute can be luminance of pixels in the sequence. The filter kernel can be used directly to determine a filtered value of a first pixel in the sequence of pixels, and the difference kernel can be used to determine a filtered value for each subsequent pixel following the first pixel in the sequence of pixels. The characteristic distance can be defined by neighboring pixels in the image. The pixels in the sequence can be arranged in a single direction in the image. The pixels in the image can be arranged in a rectangular array and the sequence of pixels can include pixels in a row, a column or a diagonal of the rectangular array.

Defining the difference kernel based on local differences between the first kernel and the second kernel can include identifying difference pixels in the neighborhood surrounding the center of the difference kernel. For each difference pixel, the first kernel and the second kernel specify substantially different filtering weights. A substantially non-zero difference weight can be defined for each difference pixel. The difference weight can be proportional to the difference between the filtering weights specified for the pixel by the first and second kernels. Identifying difference pixels can include generating a list of relative positions of the identified pixels in the neighborhood surrounding the center of the difference kernel. The list of relative positions can be used to identify current difference pixels that have a substantially non-zero difference weight when the difference kernel is centered at the current pixel. For each difference pixel, a corresponding local contribution can be determined based on the difference weight and a pixel value of the difference pixel. The corresponding local contribution of each difference pixel can be summed up to determine the difference between the filtered values of the current pixel and the previous pixel. Each pixel in the sequence can have substantially the same depth value, and for each difference pixel, determining the corresponding local contribution can include determining a substantially zero local contribution if the difference pixel has a depth value that is substantially different from the same depth value of the pixels in the sequence.

A next filter kernel can be received to determine one or more filtered values for each pixel in a next sequence of pixels in the image. A next difference kernel can be defined based on local differences between two kernels that are defined by the next filter kernel centered at adjacent pixels in the next sequence, and the next difference kernel can be used to determine differences between filtered values of adjacent pixels in the next sequence.

In general, in another aspect, the invention provides methods and apparatus, including computer program products, for depth of field filtering an image including multiple pixels. A blur filter kernel is received to determine one or more blurred values for each pixel in a sequence of pixels in the image. In the sequence, each pixel has substantially the same depth value, and adjacent pixels are separated by a characteristic distance in the image. A difference kernel is defined based on local differences between a first kernel and a second kernel. The first and second kernels are defined by the blur filter kernel centered at a first location and a second location, respectively. The second location is separated from the first location by the characteristic distance separating adjacent pixels in the sequence. The difference kernel specifies difference weights for pixels in a neighborhood surrounding a center of the difference kernel. The blur filter kernel is used directly to determine a blurred value of a first pixel in the sequence, and the difference kernel is used to determine a blurred value of each subsequent pixel following the first pixel in the sequence.

The invention can be implemented to realize one or more of the following advantages. A filter may be applied faster to a sequence of pixels by defining and using a difference kernel than by using the filter's kernel directly. The difference kernel can be defined for a flat or almost flat kernel such that the difference kernel's support will be substantially smaller than the flat kernel's support. For a flat kernel whose support has a characteristic linear size ("L") and includes a total number of pixels proportional to the square $L^2$ of the linear size, the number of pixels in the difference kernel's support can be proportional only to the linear size L. The difference kernel can be defined based on a filter kernel whose support includes one or more separate regions that have circular, elliptical, polygonal, or any other shapes defined by a perimeter in two dimensions. The difference kernel can also be defined for filter kernels having supports in three or higher dimensions. The same difference kernel can be used to determine filtered values for multiple pixels in a sequence of pixels that have substantially uniform spacing in the image. Difference kernels can be defined to apply different filters to different sequences of pixels in the image. For a depth of field filtering, difference kernels can be used to apply different blurs to different pixel sequences, such as different rows or columns in a pixel array. Using the difference kernel can accelerate depth of field filtering. The difference kernel can accelerate depth of field filtering without mixing colors of pixels that have substantially different depth values. That is, difference kernels can be applied without "color leakage." Difference kernels can also be defined based on filters that have non-flat kernels, such as gaussian kernels.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 4A-5C are schematic diagrams illustrating exemplary difference kernels.

Like reference numbers and designations in the various drawings indicate like elements.

DETAILED DESCRIPTION

Figure 1:
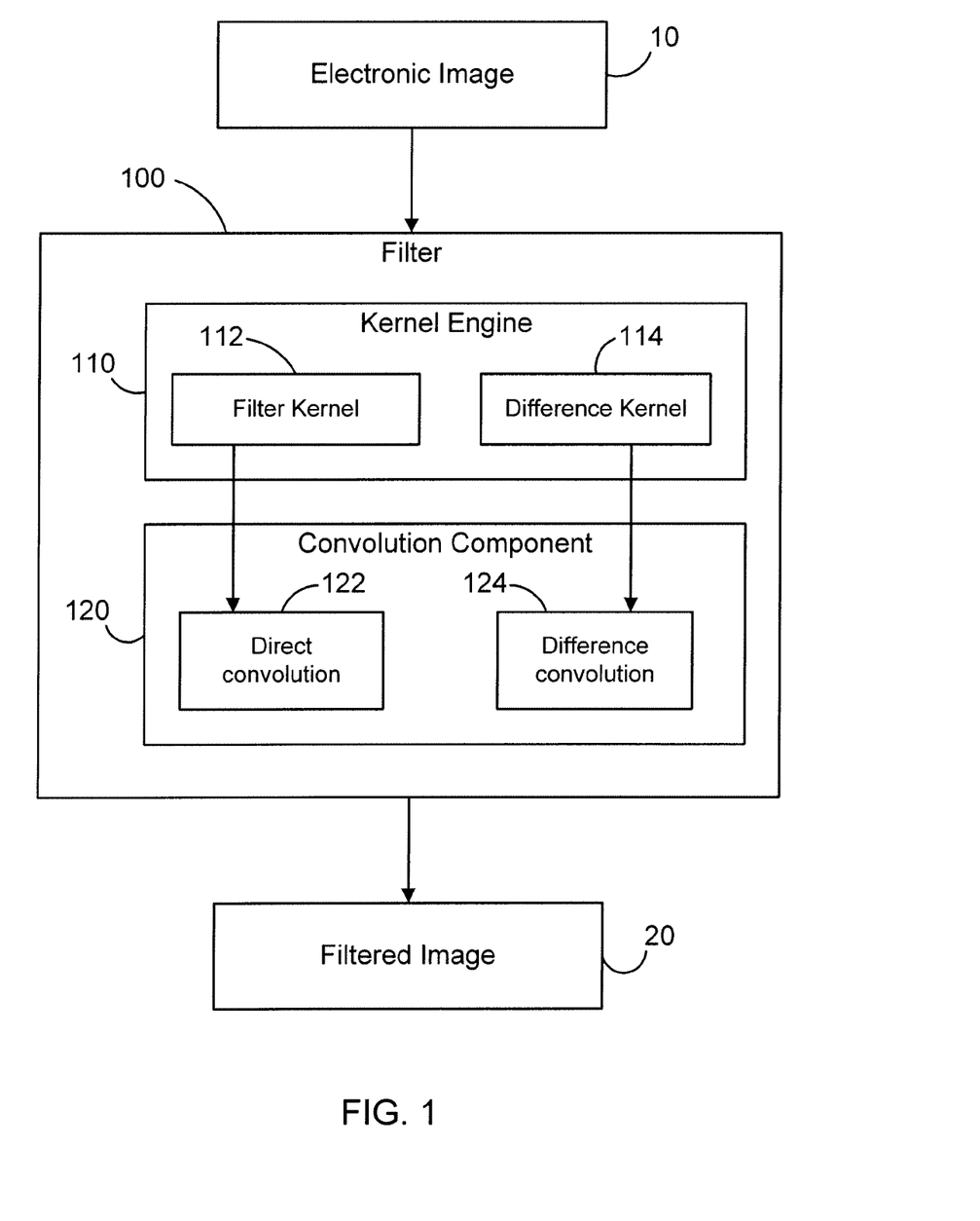
FIG. 1 is a schematic diagram illustrating a filter using difference kernels.

FIG. 1 illustrates a filter 100 that receives an electronic image 10 and transforms the image 10 into a filtered image 20. To perform the transformation, the filter 100 uses kernels to generate filtered values of local attributes, such as luminance, red, green, blue ("RGB") or other color components at one or more locations in the image. The filter 100 can apply the transformation to the image 10 to achieve visual effects. In one implementation, the filter 100 includes a depth of field filter that blurs different portions of the image 10 using optical blur kernels. For example, optical blurring can be achieved by applying flat kernels to different portions of the image 10. At each image portion, the flat kernel's support depends upon depth values associated with the image portion. In alternative implementations, the filter 100 can include a noise filter or any other filter that uses kernels to transform local attributes of the received image.

The electronic image 10 includes an array of pixels, where each pixel represents local attributes of a portion of the image 10. In one implementation, the image 10 is a digital image in which pixel attributes are specified by numerical values in a bitmap, and the filter 100 is implemented in one or more software applications or as a plug-in to a software application.

The filter 100 can also be implemented in hardware of electronic devices such as image capturing or displaying devices. For example, the filter 100 can be implemented in digital cameras, CCD devices, scanners, or portable displaying devices such as personal digital assistants or mobile phones. For portable devices, the filter 100 or portions of it can be implemented on a remote server. In electronic devices, the electronic image 10 can be specified by digital or analog electronic signals. The analog electronic signals can be digitized before processing the image. Alternatively, the filter 100 or portions of it can be implemented using analog data processing apparatus.

The filter 100 includes a kernel engine 110 and a convolution component 120. The kernel engine 110 specifies kernels for the convolution component 120. The convolution component 120 uses the specified kernels to determine filtered values of local attributes at one or more locations in the image 10, and the filter 100 generates the filtered image 20 using the filtered values of the local attributes.

The kernel engine 110 specifies a filter kernel 112 to apply the filter 100 at a current pixel of the image 10. Thus the filter kernel 112 is centered at the current pixel and assigns a respective filtering weight to each pixel in a neighborhood surrounding the current pixel in the image 10. The pixels having substantially non-zero filtering weights define a support of the filter kernel 112. The shape and size of the support or the values of the filtering weights within the support can depend upon a local attribute of the image at the center of the filter kernel. For depth of field filtering, an optical blur kernel's support can have a size that depends upon a depth value at the center of the kernel. Alternatively, the filter kernel 112 can be independent of any local attribute of the image at the center of the kernel.

In one implementation, the filter kernel 112 is defined by filtering weights arranged in a two-dimensional array in which each element corresponds to a pixel in a rectangular neighborhood that surrounds the center of the filter kernel 112. For example, the array can correspond to a square neighborhood surrounding the center of the filter kernel 112. The center of the kernel 112 defines the image location for which filtered attributes are determined using the filter kernel 112. The kernel's center can be located at or away from a geometrical center of the neighborhood defined by the array. In the array, substantially non-zero filtering weights define the support of the filter kernel 112. Thus the support's geometrical shape is not defined by the shape of the neighborhood corresponding to the array, and can include one or more substantially circular, elliptical or any other convex or concave shape in the neighborhood surrounding the center of the filter kernel 112.

In alternative implementations, the filter kernel 112 can be defined by a kernel function. The kernel function defines a filtering weight of a pixel in the image 10 based on a relative position between the pixel and the center of the filter kernel 112. For depth of field filtering, an optical blurring can be achieved using a flat kernel that is specified by a step function. The step function defines substantially uniform filtering weights for pixels that are closer to the kernel's center than a kernel radius, and substantially zero weights for pixels that are farther away. Or a Gaussian kernel is specified by a Gaussian function that defines continuously decreasing filtering weights for pixels that are farther away from the center of the kernel.

The filter engine 110 also specifies a difference kernel 114 to apply the filter 100 to pixels in a sequence of substantially uniformly spaced pixels in the image 10. The filter 100 can be applied to each pixel in the sequence using a corresponding filter kernel 112 that is centered at that pixel and is defined by the same filter kernel. That is, substantially the same filtering weights are assigned to corresponding pixels in the neighborhoods surrounding different pixels in the sequence. The image 10 typically includes such a sequence of pixels if the filter kernel 112 is independent of local attributes of the image at the kernel's center. If the filter kernel 112 depends on a local attribute of the image at the kernel's center, the sequence is specified by neighboring pixels that have substantially the same value of the local attribute. Thus substantially the same filter kernel will be specified for each pixel in the sequence. For applying a depth of field filter, the sequence is defined by neighboring pixels that have the same depth value. Thus, the same blur kernel is specified for each pixel in the sequence.

In the sequence of substantially uniformly spaced pixels, adjacent pixels are separated by a characteristic distance that is defined by an arrangement of pixels in the image. In one implementation, the image includes a rectangular array of pixels, and the sequence of pixels includes two or more pixels in a row of the pixel array. Adjacent pixels in the sequence can be first, second or farther neighbors in the row, and separated by a corresponding characteristic distance of first, second or farther neighbors, respectively. Alternatively, the sequence can include pixels in a column or a diagonal of the pixel array. The sequence can be restricted to pixels in a single direction or include neighboring pixels along a path in the pixel array.

The difference kernel 114 is defined based on local differences between two filter kernels 112 that are centered at two different locations. The two different locations are separated by the same characteristic distance as adjacent pixels in the sequence of pixels. The difference kernel 114 specifies difference weights for pixels in a neighborhood surrounding a center of the difference kernel 114. The difference kernel 114 is centered at a current pixel in the sequence to determine a difference between filtered values of the current pixel and an adjacent pixel in the sequence. Difference kernels can be defined based on any filter kernel 112, as discussed below with reference to FIGS. 3-5B.

The difference kernel 114 specifies difference weights of pixels in a neighborhood surrounding the center of the difference kernel 114. Similar to the filter kernel 112, the difference kernel 114 can be defined by a kernel function or a two-dimensional array of weights. In one implementation, the support of the difference kernel 114 is specified by a list that identifies relative locations of pixels having non-zero difference weights in the neighborhood surrounding the center of the difference kernel 114. For example, the pixel locations can be identified relative to the center of the difference kernel 114. Optionally, more than one list can be used to identify pixels in the difference kernel's support. For example, two separate lists can identify locations of pixels that have positive or negative difference weights, respectively.

The convolution component 120 uses the filter kernel 112 to calculate a direct convolution 122, and the difference kernel 114 to calculate a difference convolution 124. Based on the direct convolution 122 or the difference convolution 124, the convolution component 120 generates a filtered value of an attribute of the image at a current pixel. The filtered value can include a filtered value for luminance, gray level or a red, green or blue (RGB) color component. The filtered value can be calculated for the current pixel directly from the direct convolution 122 without using filtered values of other pixels. The difference convolution 124 is used to determine the difference between the filtered values of the current pixel and those of an adjacent pixel in a sequence of pixels. Thus for the current pixel, the filtered value can be determined based upon both the difference convolution 124 and the filtered value of the adjacent pixel.

In one implementation, the direct convolution 122 is calculated by a weighted sum of values ($V_i$) of an attribute, such as a red, green or blue component of the image 10, over all pixels (i=1, ..., N) in the support of the filter kernel 112. Each pixel in the support contributes to the direct convolution 122 in proportion to a filtering weight ("$W_i$") assigned to that pixel by the filter kernel 112. For example, the direct convolution 122 ("C") can be determined by a sum according to the following formula:

$$C=\Sigma_i W_i V_i \qquad \text{(Eq. 1)}.$$

A typical blur kernel specifies non-zero filtering weights W, to pixels in a support region surrounding the center of the kernel. If the support region has a characteristic linear size ("L") in two dimensions, the number N of all pixels in the support region is typically proportional to the square ("$L^2$") of the linear size. For a support region defined by a circle, the characteristic linear size L can be the radius of the circle, and the number N of pixels in the support is proportional to the area $\Pi L^2$ of the circle. Because each pixel in the support contributes to the direct convolution 122, the number of terms is proportional to $L^2$ in the sum of Eq. 1. If the support of the blur kernel and the corresponding number of pixels in the kernel's support are large, using the direct convolution 122 may substantially slow down because of the amount of computation required in the application of the filter.

The difference convolution 124 determines a difference between filtered values of the current pixel and a previous pixel in a sequence of pixels. In one implementation, the difference convolution 124 is calculated by summing up contributions only from those pixels (j=1, . . . , M) that have different filtering weights when the filter kernel 112 is centered at the current pixel or the previous pixel. These pixels form the support of difference kernel 114, and have difference weights ("$D_j$") that can be positive or negative depending on whether the filtering weight is larger or smaller for the current pixel than for the previous pixel. Based on the difference weights $D_j$ and values $V_j$ of a local attribute of the image, the corresponding difference convolution 124 ("$\Delta C$") can be determined as $$\Delta C = \Sigma_j D_j V_j \qquad \text{(Eq. 2)}.$$

The support of the difference kernel 114 can include a substantially smaller number M of pixels than the total number N of pixels in the filter kernel's support. For example, a flat filter kernel 112 assigns substantially the same filtering weight W to all pixels in a support region surrounding the center of the kernel. When the filter kernel is centered at the current pixel or the previous pixel, the filtering weights remain substantially the same for pixels that are included in both of the support regions that surround the current pixel and the previous pixel. If the current pixel is separated from the previous pixel by a distance that is substantially smaller than the characteristic linear size ("L") of the support region, the filter kernels centered at the current and previous pixels assign different filtering weights only to pixels that are near the perimeter of the support regions. Because the perimeter is proportional to the linear size L of the support region, the number M of pixels in the difference kernel's support is also proportional to the linear size L. Thus for a large flat kernel, the difference convolution 124 can be calculated by summing a substantially smaller number M of terms (in the order of L, Eq. 2) than the number N of the terms (in the order of $L^2$, Eq. 1) required to calculate the direct convolution 122.

For depth of field filtering, the convolution component 120 can be implemented to determine the direct convolution 122 and the difference convolution 124 without causing color leakage, that is, without mixing colors of pixels that have substantially different depth values. In this implementation, Eqs. 1 and 2 are modified such that only those pixel values $V_i$ are summed up that have substantially the same depth value as the depth value at the center of the corresponding kernel. Thus in Eqs. 1 and 2, the direct 122 or difference 124 convolutions do not receive contributions from pixels that have substantially different depth values than the depth value at the center. In one implementation, an image includes pixels that have binary depth values corresponding to objects in focus (zero depth value) or out of focus (non-zero depth value). By omitting the in-focus pixels from the sums of Eqs. 1 and 2, the out-of-focus pixels can be blurred without color contributions from the in-focus pixels.

Figure 2:
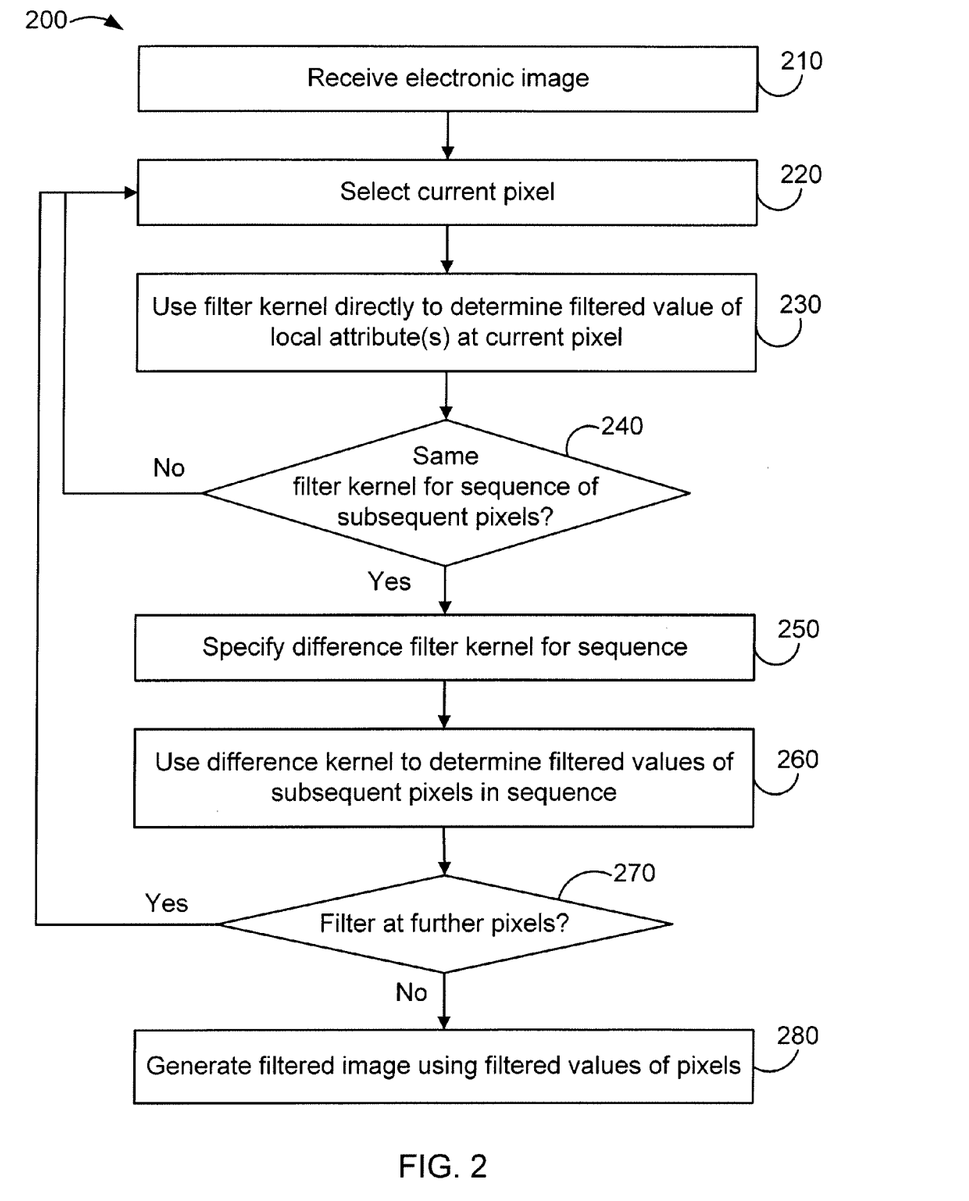
FIGS. 2 and 3 are schematic flow diagrams illustrating methods for using and defining difference kernels.

FIG. 2 illustrates a method 200 for using difference kernels to filter images. The method can be performed by a system that includes the filter 100 (FIG. 1). In one implementation, the system includes a depth of field filter specifying optical blur kernels based upon depth values of pixels in an image. Alternatively, the system can include a filter that uses kernels for noise filtering or adjusting luminance or any other graphical attribute of the image.

The system receives an electronic image including multiple pixels (step 210). Each pixel specifies one or more attributes of a corresponding portion of the image. For example, the received image is a digital image specified by pixel values in a bitmap. Or each pixel in the received image can be specified by a corresponding analog electronic signal. The multiple pixels of the image can be arranged in a rectangular pixel array defining rows and columns of pixels.

The system selects a current pixel in the received image (step 220). The current pixel is selected to generate one or more filtered values for the current pixel in a filtered image. The current pixel can be selected as a next pixel according to a predetermined processing order. For an image including a rectangular pixel array, the processing order can specify a sequence of rows, such as from top row to bottom row, and a sequence of pixels within each row, such as from left to right. Optionally, a rectangular pixel array can be processed in parallel by multiple filtering units, where each unit selects a corresponding pixel in the received image.

The system uses a filter kernel directly to determine a corresponding filtered value of one or more local attributes of the image at the current pixel (step 230). The local attributes can include luminosity, red, green, blue or any other color component. In one implementation, the system uses the filter kernel to calculate a direct convolution for each local attribute according to Eq. 1, and specifies the corresponding filtered value based upon the direct convolution. For a flat filtering kernel specifying substantially the same filtering weight ($W_i$=W) to all pixels in a support region surrounding the current pixel, the direct convolution can be calculated by averaging the pixel values $V_i$ of all pixels in the support region, and multiplying the average with the filtering weight W. To avoid color leakage in depth of field filtering, the average can be restricted to those pixels that have substantially the same depth value as a depth value of the current pixel. In alternative implementations, filtered values can be calculated for the current pixel based on known Fourier techniques.

The system verifies whether the filter specifies the same filter kernel for subsequent pixels that follow the current pixel in a sequence of uniformly spaced pixels (decision 240). In an array of uniformly spaced pixels, the system can identify pixels that follow the current pixel in a row, and verify whether the same filter is specified for subsequent pixels in the row. For depth of field filtering, the system can verify whether the subsequent pixels have substantially the same depth value as the current pixel.

If the filter specifies different filter kernels for subsequent pixels than for the current pixel ("No" branch of decision 240), the system selects a new current pixel (step 220) and uses the filter kernel directly to determine filtered values for the new current pixel (step 230).

If the filter specifies substantially the same filter kernel for subsequent pixels in a sequence ("Yes" branch of decision 240), the system specifies a difference kernel for the sequence (step 250). The difference kernel is defined based on local differences between two kernels that are defined by the same filter kernel centered at two different center locations. The center locations are separated by a distance that also separates two adjacent pixels in the sequence of uniformly spaced pixels. The difference kernel can be defined each time the system identifies an appropriate sequence of pixels. Alternatively, the system can use one or more predefined difference kernels. From the predefined difference kernels, the system can select or derive (for example, by a symmetry transformation) a difference kernel that corresponds to the sequence of pixels. Defining difference kernels is further discussed with reference to FIGS. 3-5B.

The system uses the difference kernel to determine filtered values of the subsequent pixels in the sequence (step 260). The system uses the difference kernel to determine a corresponding difference convolution for each pixel in the sequence based on values of pixels in the support of the difference kernel. Each difference convolution represents a difference between filtered values of adjacent pixels in the sequence. For the first pixel in the sequence, a filtered value has been determined using the filter kernel directly. Thus the system can iteratively determine a filtered value for each subsequent pixel in the sequence using the difference convolution for the subsequent pixel and a filtered value of a corresponding adjacent pixel.

The system verifies whether the image should be filtered at further pixels (decision 270). If a processing order has been established for filtering the image, the system can verify whether an end of the processing order has been reached. For a pixel array that is processed row-by-row, the system can verify whether an end of a row is reached or whether all rows of the image have been processed.

If there are further pixels to filter ("Yes" branch of decision 270), the system selects a new current pixel (step 220), and determines filtered values for the further pixels using the difference kernels or directly the filter kernel (steps 230-260). If there are no further pixels to filter ("No" branch of decision 270), the system generates a filtered image using the filtered values of pixels in the image.

In alternative implementations, the system can determine the number of subsequent pixels for which the same filter kernel is specified, and in decision 240, decide to use the filter kernel directly (that is, to return to step 220) if the determined number is less than a threshold value. In one implementation, the threshold value is the length of a row in a pixel array. That is, the filter kernel is used directly for all pixels in a sequence that is shorter than the row, and the difference kernel is used only if the same filter kernel is specified for all pixels in the row. Alternatively, the threshold value can be determined based on a balance between a computational effort of defining a difference kernel and an estimated acceleration that is provided by using the difference kernel.

The system can also decide to use the difference kernel even if the same filter kernel is not applicable for all pixels in a sequence. In such an implementation, filtered values are determined for all pixels in the sequence, but the determined values are used only at those pixels where the filter is applicable. For depth of field filtering in a row of a pixel array, pixels may have substantially the same depth values in the row except a few pixels that have substantially zero depth values. Although no blurring should be applied at the few pixels with zero depth value, the filtered values of these pixels can be determined and used to determine filtered values of subsequent pixels in the row.

Figure 3:
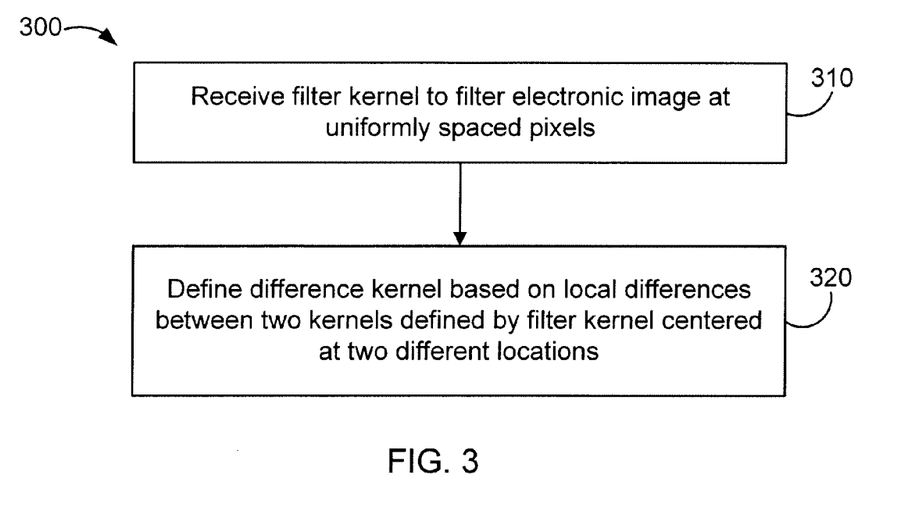

FIG. 3 illustrates a method 300 for defining difference kernels. The method 300 can be performed by a system including a kernel engine 110 (FIG. 1).

Figure 5A:
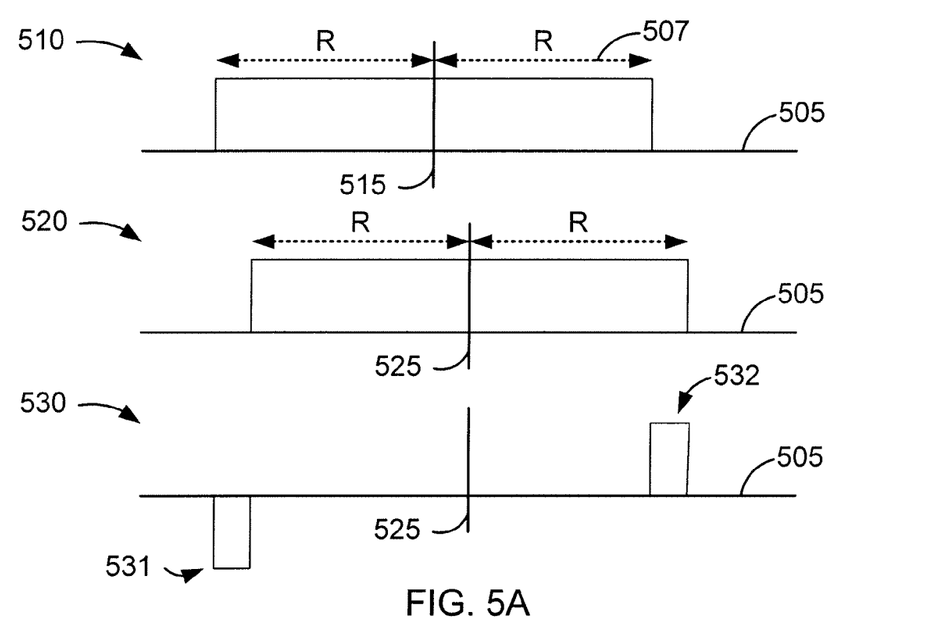
Figure 5B:
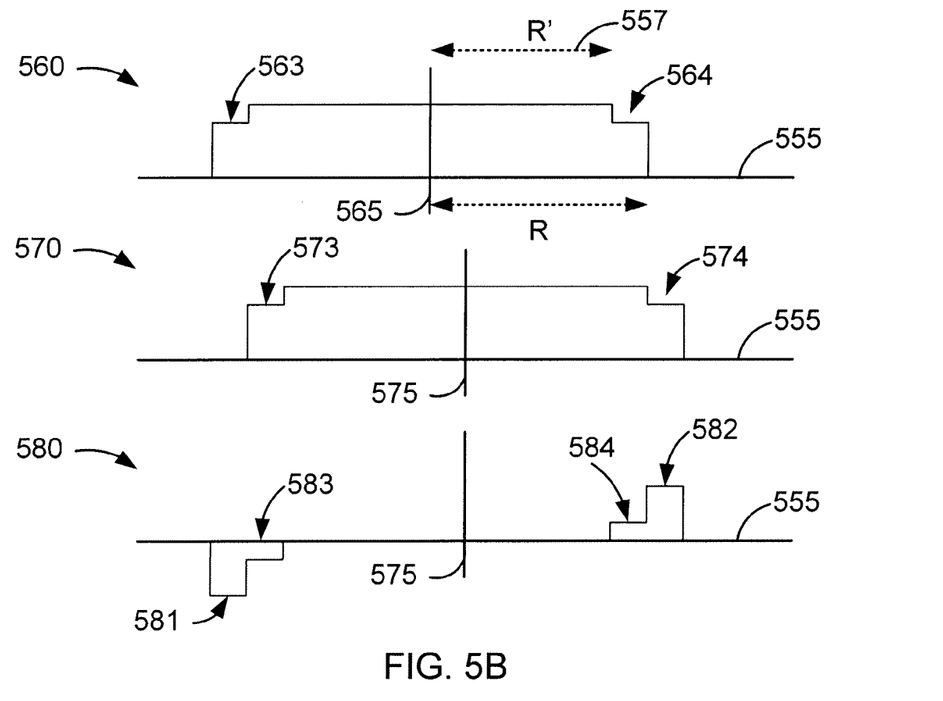

The system receives a filter kernel to filter an electronic image at each pixel in a sequence of uniformly spaced pixels (step 310). In one implementation, the received filter kernel is a flat kernel assigning substantially uniform filtering weights to pixels in a neighborhood surrounding a center of the filter kernel. An exemplary flat kernel is illustrated in FIG. 5A. Alternatively, the received kernel can assign non-uniform filtering weights to pixels in the kernel's support. For example, the filter kernel can be an "almost flat" kernel that includes at least one flat portion, but also specifies non-zero filtering weights that are different from those in the flat portion. That is, the almost flat kernel specifies substantially uniform filtering weights to pixels within a core region of the kernel's support and other non-zero filtering weights to some of the pixels within the neighborhood surrounding the kernel's center. An example of an almost flat kernel is a tapered flat kernel that, near the edge of the kernel's support, specifies smaller weights than the substantially uniform weight in the core region of the support. Tapered flat kernels can be used to achieve antialiasing effects. An exemplary almost flat kernel is illustrated in FIG. 5B. In alternative implementations, the received kernel can also be a gaussian kernel, a kernel for noise filtering or any other kernel, such as a triangular kernel illustrated in FIG. 5C.

The system defines a difference kernel based on local differences between a previous kernel and a current kernel (step 320). The previous and current kernels are defined by the filter kernel centered at a previous location and a current location that are separated by a characteristic distance that also separates two adjacent pixels in the sequence. The defined difference kernel is centered at the current location. In one implementation, the sequence of pixels includes neighboring pixels in an array of uniformly spaced pixels, and the characteristic distance is a distance between the neighboring pixels. Depending on a relative orientation of adjacent pixels in the sequence, the system can define the difference kernel for adjacent pixels in a row, a column, or a diagonal of the pixel array.

For symmetric filter kernels, such as flat kernels with circular or rectangular support, a basic difference kernel can be defined for a particular relative orientation and ordering of the previous and current locations. From the basic difference kernel, other difference kernels can be specified for different relative orientation or ordering of the current and previous locations by applying a corresponding symmetry transformation to the basic difference kernel. For a filter kernel with circular or square symmetry, a basic difference kernel can be defined for two adjacent pixels in a row, and another difference kernel can be defined for adjacent pixels in a column by a ninety degree rotation of the basic difference kernel. Or the basic difference kernel can be defined for a sequence ordered from left to right in a row, and the difference kernel for right to left can be defined by an appropriate mirroring of the basic difference kernel. For filter kernels with a non-symmetric support or filtering weights, separate difference kernels can be defined for different orientations or ordering.

For a flat filter kernel, defining the difference kernel can include identifying pixels that are in the support of only one of the previous and current kernels. The pixels that are included only in the support of the previous kernel are called trailing pixels, and the pixels that are included only in the support of the current kernel are called leading pixels. The trailing and leading pixels define the support of the difference kernel. After identifying its support, the difference kernel is defined to assign substantially uniform negative difference weight to each trailing pixel, and substantially uniform positive weight to each leading pixel.

For a non-flat filter kernel, defining the difference kernel can include identifying difference pixels, and calculating a corresponding difference weight for each difference pixel. Each difference pixel is a pixel in a neighborhood surrounding the current pixel. To each difference pixel, the previous and current kernels assign substantially different filtering weights. Thus the difference pixels include the trailing and leading pixels and pixels that are in the support of both of the previous and current kernels, but the previous and current kernels specify different filtering weights for these pixels. Next, a difference weight is determined for each difference pixel such that the difference weight is proportional to the difference between the filtering weights assigned to the difference pixel by the current and previous pixels.

Figure 4A:
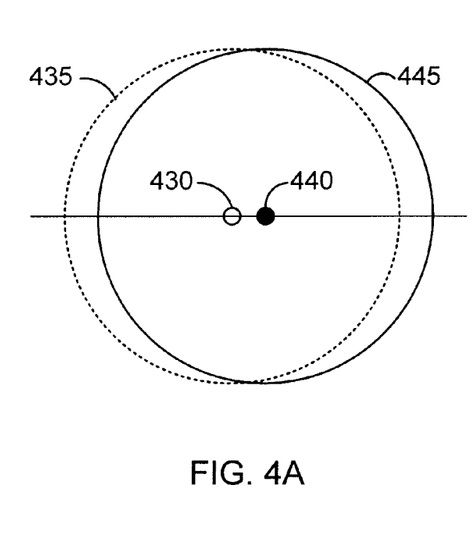
Figure 4B:
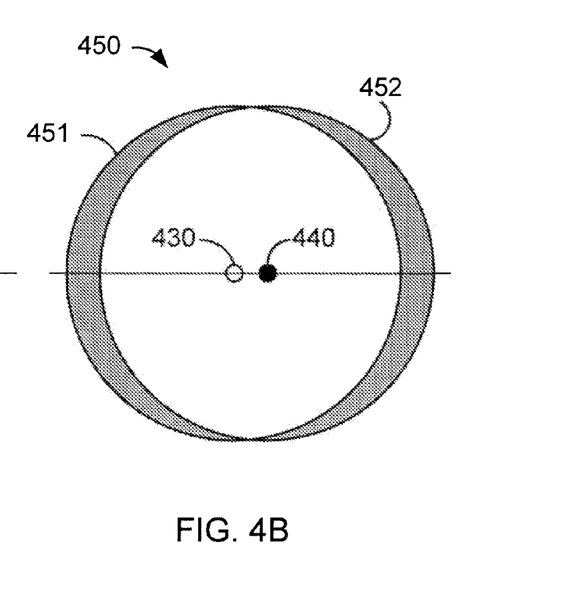

FIGS. 4A and 4B illustrate an exemplary implementation of defining a difference kernel 450 based on local differences between a previous kernel 435 and a current kernel 445. The previous kernel 435 and current kernel 445 are defined by the same filter kernel centered at a previous location 430 and a current location 440, respectively. In the exemplary implementation, the filter kernel is a flat kernel having a circular support. A trailing edge 451 is defined by that portion of the previous kernel's support which is not included in the current kernel's support, and a leading edge 452 is defined by that portion of the current kernel's support which is not included in the previous kernel's support.

The difference kernel 450 assigns a negative difference weight to pixels within the trailing edge 451 and a positive difference weight to pixels in the leading edge 452. Pixels have zero difference weights outside the trailing 451 and leading 452 edges. The difference kernel 450 is centered at the current location 440, and can be used to determine a difference between filtered values of a local attribute at adjacent pixels that have a relative orientation similar to that of the previous location 430 and the current location 440.

FIGS. 5A and 5B illustrate exemplary implementations of defining difference weights for difference filters. FIG. 5A illustrates a first exemplary implementation in which a difference kernel 530 is defined based on local differences between a previous kernel 510 and a current kernel 520. The previous kernel 510 and the current kernel 520 are defined by a symmetric flat filter kernel that assigns substantially the same filtering weights to pixels that are closer to a center of the filter kernel than a kernel radius 507 ("R"). The previous kernel 510 is centered at a previous location 515 and the current kernel 520 is centered at a current location 525. The previous kernel 510 and the current kernel 520 specify filtering weights which are illustrated by histograms at their corresponding locations in a direction 505. The direction 505 can represent a row, a column, a diagonal or any other direction in a pixel array.

The difference kernel 530 is centered at the current location 525 and specifies difference weights, which are also illustrated by histograms at their corresponding locations in the direction 505. Substantially non-zero difference weights are specified only for a trailing edge 531 and a leading edge 532. The trailing edge 531 identifies pixels that are included only in the support of the previous kernel 510, and the leading edge 532 identifies pixels that are included only in the support of the current kernel 520. The trailing edge 531 and the leading edge 532 define the support of the difference kernel. The difference kernel 530 assigns a negative difference weight to pixels in the trailing edge 531, and a positive difference weight to pixels in the leading edge 532. The absolute value of the assigned difference weights is substantially the same for both of the positive and negative weights.

FIG. 5B illustrates a second exemplary implementation in which a difference kernel 580 is defined based on local differences between a previous kernel 560 and a current kernel 570. The previous kernel 560 and the current kernel 570 are defined by a symmetric filter kernel that is "almost" flat. That is, the filter kernel assigns a first filtering weight to all pixels that are closer to a center of the filter kernel than a core radius 557 (R'). Pixels that are farther from the center than the core radius R' but closer to the center than the kernel radius R have a second filtering weight that is smaller than the first filtering weight.

The previous kernel 560 is centered at a previous location 565 and the current kernel 570 is centered at a current location 575. The previous kernel 560 and the current kernel 570 specify filtering weights, which are illustrated by histograms at their corresponding locations in a direction 555. The previous kernel 560 assigns the first filtering weight to all pixels that are closer to the previous location 565 than the core radius R', and the second filtering weight to pixels in regions 563 and 564 that are farther than the core radius R' but closer than the kernel radius R. Similarly, the current kernel 570 assigns the first filtering weight to all pixels that are closer to the current location 575 than the core radius R', and the second filtering weight to pixels in regions 573 and 574 that are farther than the core radius R' but closer than the kernel radius R.

The difference kernel 580 is centered at the current location 575 and specifies difference weights, which are also illustrated by histograms at their corresponding locations in the direction 555. Substantially non-zero difference weights are specified for a trailing edge 581, a leading edge 582, a trailing difference region 583 and a leading difference region 584. The trailing edge 581 identifies pixels that are included only in the support of the previous kernel 560, and the leading edge 582 identifies pixels that are included only in the support of the current kernel 570. The trailing and leading difference regions 583 and 584 identify pixels that are included in both the support of the previous kernel 560 and in the support of the current kernel 570, but the previous kernel 560 and the current kernel 570 assign different filtering weights to these pixels.

The trailing and leading edges 581 and 582, and the trailing and leading difference regions 583 and 584 have difference weights that are proportional to the difference between the filtering weights specified by the current kernel 570 and the previous kernel 560 in corresponding regions along the direction 555. For example, the trailing edge 581 has a difference weight that is the negative of the second filtering weight in the region 563 of the previous kernel 560. The trailing difference region 583 has a difference weight that is a difference between the second filtering weight in the region 573 of the current kernel 570 and the first filtering weight specified for the same region by the previous kernel 560. Because the kernels 560 and 570 are symmetric, the leading edge 582 and the leading difference region 584 have difference weights that have mirror values (the same absolute value but different sign) of the trailing edge 581 and the trailing difference region 583, respectively.

Figure 5C:
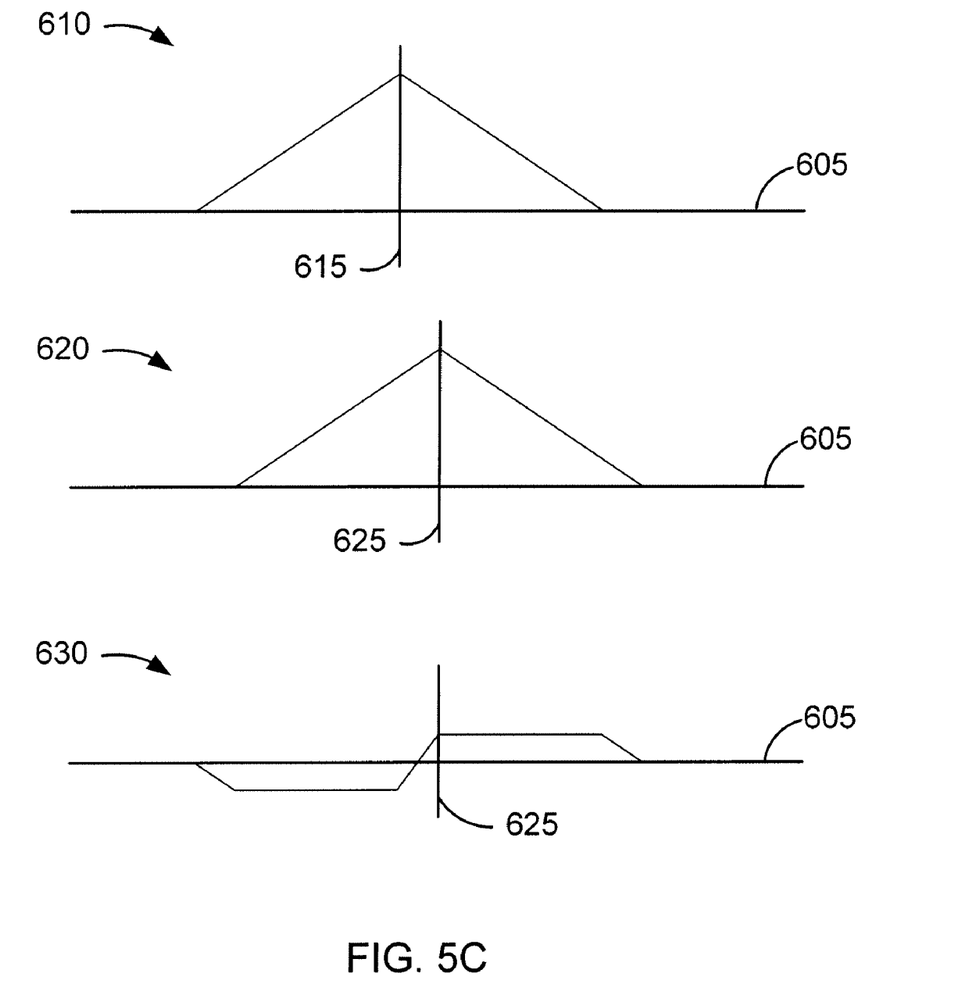

FIG. 5C illustrates a third exemplary implementation in which a difference kernel 630 is defined based on local differences between a previous kernel 610 and a current kernel 620. The previous kernel 610 and the current kernel 620 are defined by a symmetric non-flat filter kernel that has a triangular profile. That is, the filter kernel assigns the largest filtering weight to a pixel at the center of the kernel, and linearly decreasing filtering weights to pixels that are farther from the center. The previous kernel 610 is centered at a previous location 615 and the current kernel 620 is centered at a current location 625. The previous kernel 610 and the current kernel 620 specify filtering weights, which are illustrated at their corresponding locations in a direction 605. The direction 605 can represent a row, a column, a diagonal or any other direction in a pixel array. The difference kernel 630 is centered at the current location 625 and specifies difference weights, which are also illustrated at their corresponding locations in the direction 605. Substantially non-zero difference weights are specified for the supports of both the previous kernel 610 and the current kernel 620.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A system for filtering an image including a plurality of pixels, the system comprising:
   a kernel engine for receiving a filter kernel to determine one or more filtered values for each pixel in a sequence of pixels in the image, adjacent pixels in the sequence being separated by a characteristic distance in the image, the filter kernel specifying filtering weights for pixels in a neighborhood surrounding a center of the filter kernel;
   wherein the kernel engine is configured to define a difference kernel based on local differences between a first kernel and a second kernel, the first and second kernels being defined by the filter kernel centered at a first location and a second location, respectively, the second location being separated from the first location by the characteristic distance separating adjacent pixels in the sequence, the difference kernel specifying difference weights for pixels in a neighborhood surrounding a center of the difference kernel; and
   a convolution component for using the difference kernel to determine a difference between a filtered value of a current pixel and a filtered value of a previous pixel that is adjacent to the current pixel in the sequence.

2. The system of claim 1, wherein the filtered value of the current pixel is determined based on the filtered value of the previous pixel and the difference between the filtered values of the current pixel and the previous pixel.

3. The system of claim 1, wherein the filter kernel specifies substantially uniform filtering weights for pixels in a region within the neighborhood surrounding the center of the filter kernel.

4. The system of claim 1, wherein the filter kernel specifies substantially non-zero filtering weights for pixels in one or more regions having convex or concave shapes within the neighborhood surrounding the center of the filter kernel.

5. The system of claim 4, wherein the filter kernel specifies substantially non-zero filtering weights for pixels in a circular or elliptical region within the neighborhood surrounding the center of the filter kernel.

6. The system of claim 1, wherein:
  each pixel in the sequence specifies substantially the same value for a local attribute of the image; and
  the received filter kernel is based upon the same value of the local attribute.

7. The system of claim 6, wherein the local attribute is a depth value corresponding to a distance of objects represented by pixels in the sequence relative to a focal distance.

8. The system of claim 6, wherein the local attribute is a luminance of pixels in the sequence.

9. The system of claim 1, wherein the convolution component is further configured to use the filter kernel directly to determine a filtered value of a first pixel in the sequence of pixels, and, use the difference kernel to determine a filtered value for each subsequent pixel following the first pixel in the sequence of pixels.

10. The system of claim 1, wherein the characteristic distance is defined by neighboring pixels in the image.

11. The system of claim 1, wherein the pixels in the sequence are arranged in a single direction in the image.

12. The system of claim 11, wherein the pixels in the image are arranged in a rectangular array and the sequence of pixels includes pixels in a row, a column or a diagonal of the rectangular array.

13. The system of claim 1, wherein to define the difference kernel based on local differences between the first kernel and the second kernel, the kernel engine is configured to:
  identify difference pixels in the neighborhood surrounding the center of the difference kernel, for each difference pixel, the first kernel and the second kernel specifying substantially different filtering weights; and
  define a substantially non-zero difference weight for each difference pixel.

14. The system of claim 13, wherein for each difference pixel, the kernel engine is configured to define a difference weight that is proportional to the difference between the filtering weights specified for the pixel by the first and second kernels, to define the substantially non-zero difference weight.

15. The system of claim 13, wherein to identify difference pixels, a list of relative positions of the identified pixels in the neighborhood surrounding the center of the difference kernel is generated, and, the list of relative positions is used to identify current difference pixels that have the substantially non-zero difference weight when the difference kernel is centered at the current pixel.

16. The system of claim 13, wherein for each difference pixel, a corresponding local contribution is determined based on the difference weight and a pixel value of the difference pixel, and, the corresponding local contribution of each difference pixel is summed to determine the difference between the filtered values of the current pixel and the previous pixel.

17. The system of claim 16, wherein:
  each pixel in the sequence has substantially the same depth value; and
  for each difference pixel, a substantially zero local contribution is determined if the difference pixel has a depth value that is substantially different from the same depth value of the pixels in the sequence to determine the corresponding local contribution.

18. The system of claim 1, wherein:
  the kernel engine is configured to receive a next filter kernel to determine one or more filtered values for each pixel in a next sequence of pixels in the image;
  the kernel engine is further configured to define a next difference kernel based on local differences between two kernels that are defined by the next filter kernel centered at adjacent pixels in the next sequence; and
  the convolution component is configured to use the next difference kernel to determine differences between filtered values of adjacent pixels in the next sequence.

19. A system for depth of field filtering an image including a plurality of pixels, the system comprising:
  a kernel engine for receiving a blur filter kernel to determine one or more blurred values for each pixel in a sequence of pixels in the image, each pixel in the sequence having substantially the same depth value, adjacent pixels in the sequence being separated by a characteristic distance in the image;
  wherein the kernel engine is configured to define a difference kernel based on local differences between a first kernel and a second kernel, the first and second kernels being defined by the blur filter kernel centered at a first location and a second location, respectively, the second location being separated from the first location by the characteristic distance separating adjacent pixels in the sequence, the difference kernel specifying difference weights for pixels in a neighborhood surrounding a center of the difference kernel; and
  a convolution component for using the blur filter kernel directly to determine a blurred value of a first pixel in the sequence;
  wherein the convolution component is configured to use the difference kernel to determine a blurred value of each subsequent pixel following the first pixel in the sequence.

* * * * *